Sept. 22, 1931.   D. ALTER   1,824,254
RADIO AERIAL
Filed June 22, 1928
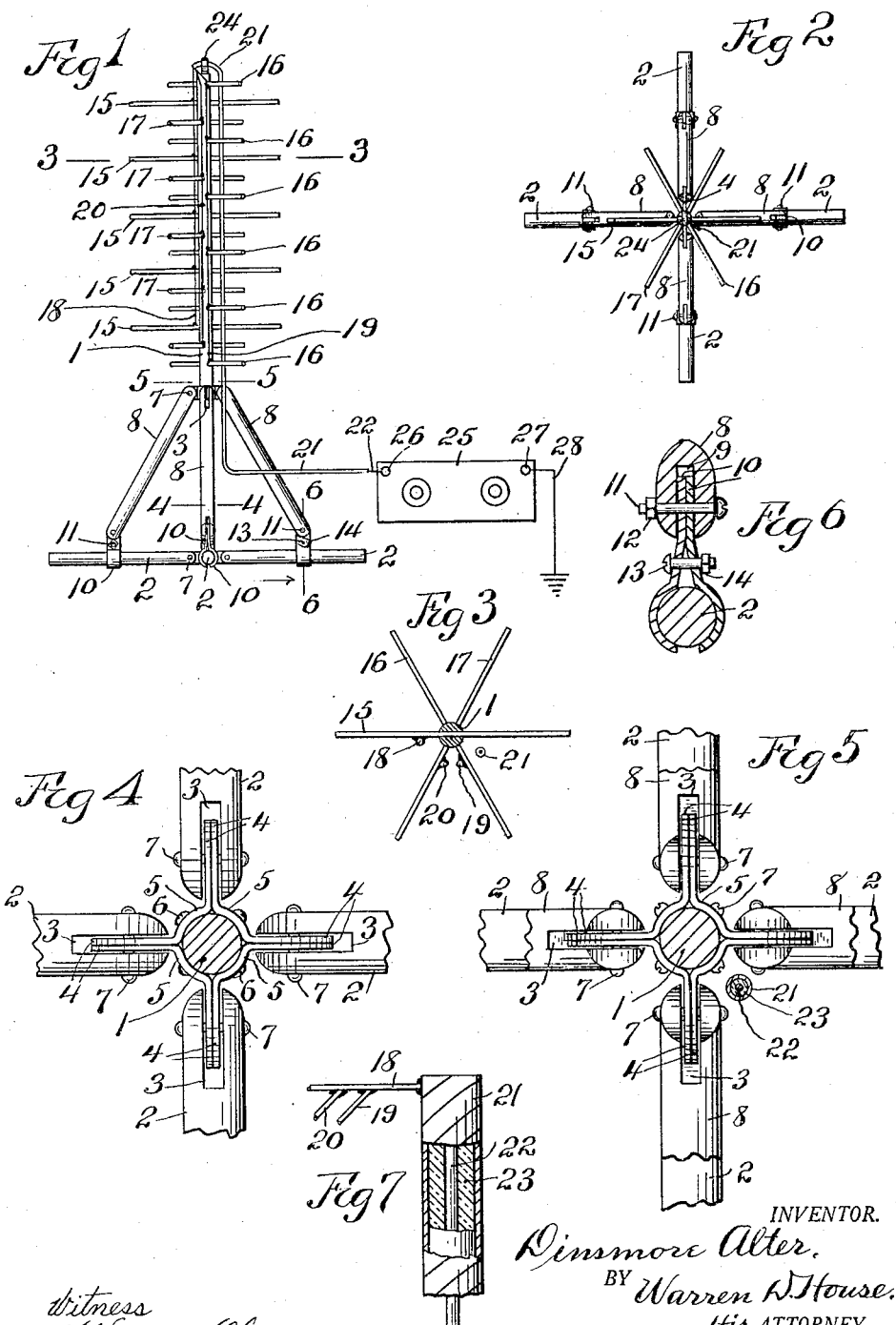
INVENTOR.
Dinsmore Alter.
BY Warren D. House.
His ATTORNEY.
Witness
H. Vernon Olson Patented Sept. 22, 1931

1,824,254

UNITED STATES PATENT OFFICE

DINSMORE ALTER, OF LAWRENCE, KANSAS

RADIO AERIAL

Application filed June 22, 1928. Serial No. 287,428.

My invention relates to improvements in radio aerials.

One of the objects of my invention is to provide a novel aerial, which eliminates the necessity of stringing an aerial wire between two spaced apart supports, which is simple, cheap, durable, not likely to get out of order, which obtains sharp tuning and great volume, and which is capable of being collapsed to small space for shipment or storage.

The novel features of my invention are hereinafter fully described and claimed.

In the accompanying drawings, which illustrate the preferred embodiment of my invention, Fig. 1 is a reduced elevation of the preferred embodiment of my invention.

Fig. 2 is a top view of the same.

Fig. 3 is a cross section on the line 3—3 of Fig. 1, some parts below being omitted.

Fig. 4 is an enlarged section on the line 4—4 of Fig. 1.

Fig. 5 is an enlarged section on the line 5—5 of Fig. 1.

Fig. 6 is an enlarged section on the line 6—6 of Fig. 1.

Fig. 7 is a fragmental portion of the upper part of the lead in conductor, shown partly in elevation, and partly broken away.

Similar reference characters designate similar parts in the different views.

1 designates a pole, which may be of wood, and which is supported, preferably, by a collapsible supporting means comprising supporting members 2, which are pivotally connected on horizontal axes so as to swing from a position parallel with the pole 1 to the horizontal supporting positions, shown in the drawings.

For pivotally supporting the inner ends of the members 2, each member has at its inner end a slot 3 into which extend two adjacent arms 4 of two of four fastening members, each of which has an arcuate transverse portion 5 fastened by a screw 6 to the pole 1, and the arms of which fastening member extend radially at right angles to each other. Horizontal transverse pivotal pins 7 respectively extend through the inner end portions of the members 2 and through the adjacent arms 4, Fig. 4.

For bracing the pole 1 and releasably holding the members 2 in the horizontal supporting positions, there are provided four brace members 8, the upper ends of which are pivoted on horizontal axes to the pole 1, above the members 2, in the same manner as are pivoted the members 2 to the pole, in that the upper ends of the members 8 are provided respectively with slots 3 into which are extended arms 4 of fastening members having arcuate portions 5 fastened to the pole 1 by screws 6, pivot pins 7 being extended respectively through the members 8 and the adjacent arms 4.

For pivotally and releasably fastening the lower ends of the brace members 8 to the members 2 respectively, each member 8 has in its lower end a slot 9 into which extend two clamping plates 10. Four bolts 11 extend respectively through the members 8 and the adjacent plates 10, said bolts having respectively mounted on them nuts 12 by which the bolts are retained in their proper positions.

The lower portion of each plate 10 is concavely arcuate on its inner side. The arcuate portions of each pair of adjacent plates 10 have removably mounted in them one of the members 2 to which they are clamped by a transverse bolt 13 which extends through the plates 10 between the member 2 and the adjacent brace member 8, said plates 10 being spaced apart where the bolt 13 passes through them.

Each bolt 13 has mounted on it a nut 14, which by tightening causes the plates 10 to firmly clamp the members 2.

By loosening, or removing the nuts 14, the plates 10 may be released from the members 2, so that the brace members 8 and the supporting members 2 may be swung to positions parallel with the pole 1, for storing or shipment purposes.

Extending through transverse holes in the pole 1 provided therefor, are horizontal radial receiving conducting members 15, which may be wires, and which are disposed in different horizontal planes and in the same vertical plane. The wires 15 are removable for shipment purposes, or storing, and they extend from both sides of the pole 1.

A similar set of conducting receiving members comprising wires 16 are extended, similarly to the wires 15, through horizontal radial holes in the pole 1, and said wires 16 extend horizontally and radially from both sides of the pole 1 in a vertical plane disposed at an angle to the vertical plane of the wires 15. The wires 16 are also disposed in different horizontal planes and alternate with the wires 15.

A third set of conducting receiving members comprising wires 17 extend through horizontal radial holes in the pole 1 and are disposed in different horizontal planes alternating with the wires 15 and 16, and are in a vertical plane which is at an angle to the vertical planes of the wires 15 and 16. The wires 17 also extend radially from both sides of the pole 1, and are, as are the wires 16 and 15, removable from the pole.

Conducting means comprising three wires 18, 19 and 20 respectively connect the wires 15, 16 and 17 of the three sets of wires, the wires at their upper ends being fastened together at their upper ends, as shown in Fig. 7, one wire, as 18, being fastened to a lead in conductor, which, as shown, may be a metal covering 21.

The covering 21 may have in it, as shown, a conductor 22, insulation 23 being provided in the covering 21 around the conductor 22, Fig. 7.

The cable, comprising the conductor 22, insulation 23, and metal covering 21, is supported by being passed through the eye of a screw eye 24 mounted in the top of the pole 1, Figs. 1 and 2.

In connecting to a receiving set 25, the conductor 22 may be connected to the aerial binding post 26, in which case the cable forms a condenser in which the covering 21 and the conductor 22 forms the leaves thereof.

The ground binding post of the set 25, designated by the numeral 27 is connected in the usual manner by a conductor 28 to ground.

The wires 15, 16 and 17 are disposed apart a distance such that they will be substantially non-inductively related to each other, which distance I have found should be not less than three inches, to obtain the best results.

In the operation of the device, the parts having been assembled as described, the radio waves will be intercepted by the wires 15, 16 and 17, and the potential established therein will be conveyed by the conductors 18, 19 and 20 to the covering 21, thereby inducing in the conductor 22 a potential which will be carried thereby to the receiving set 25.

In assembling the device, the wires 15, 16 and 17 are inserted through the holes in the pole provided therefor, after which the members 2 are disposed horizontally with the plates 10 clamped thereto by the bolts 13 and nuts 14, the length of the brace members 8 being such that they will be disposed in the inclined positions shown in Fig. 1.

In disassembling, the wires 15, 16 and 17 are withdrawn from the pole 1, after which they with the conductors 18, 19 and 20 may be disposed parallel with and against the pole 1.

The nuts 14 are then loosened or removed, so as to permit the plates 10 being removed from the members 2, at which time, the latter and the members 8 may also be disposed parallel with the pole 1, thus making a small compact bundle.

I do not limit my invention to the structure shown and described, as many modifications, within the scope of the appended claim, may be made without departing from the spirit of my invention.

What I claim is:—

In a radio aerial, a pole having transverse holes disposed in different transverse and longitudinal radial planes, conductive receiving members slidably and removably fitted in said holes respectively, said holes and members being so spaced that said members are substantially non-inductively related to each other, and conducting wires connecting said members, and adapted when said members are withdrawn from said holes to be disposed therewith alongside of and parallel with said pole.

In testimony whereof I have signed my name to this specification.

DINSMORE ALTER.